United States Patent [19]

Weiss

[11] Patent Number: 4,480,797

[45] Date of Patent: Nov. 6, 1984

[54] INSTALLATION FOR TREATMENT OF WASTE METAL AND LIQUID DROSS

[75] Inventor: Anton Weiss, Vienna, Austria

[73] Assignee: Waagner-Biro Aktiengesellschaft, Austria

[21] Appl. No.: 409,991

[22] Filed: Aug. 20, 1982

Related U.S. Application Data

[62] Division of Ser. No. 232,309, Feb. 6, 1981, Pat. No. 4,394,978.

[30] Foreign Application Priority Data

Feb. 18, 1980 [AT] Austria .................................. 870/80

[51] Int. Cl.$^3$ ............................................. B02C 17/04
[52] U.S. Cl. ......................................... 241/65; 241/284
[58] Field of Search .................... 241/65, 66, 60, 171, 241/284

[56] References Cited

U.S. PATENT DOCUMENTS 2,029,917  2/1936  Frisch .............................. 241/171 X
3,179,345  4/1965  Kivert et al. ..................... 241/171 X
4,357,111 11/1982  Honemeyer et al. ............. 241/65 X

FOREIGN PATENT DOCUMENTS 75067  6/1977  Japan ...................................... 241/65
343132  of 1972  U.S.S.R. .............................. 241/65

Primary Examiner—Howard N. Goldberg
Assistant Examiner—Timothy V. Eley
Attorney, Agent, or Firm—Steinberg & Raskin

[57] ABSTRACT

In an apparatus for treating liquid dross wherein the dross is situated in a skimming trough and charged into a rotating, substantially horizontal cooling pipe through which it passes so that the dross is cooled to a temperature below the melting point thereof to obtain a granulated form, the dross is charged from the skimming tank into the cooling pipe and passed therethrough substantially in the absence of air or oxygen whereupon the cooled granulated dross is subjected to an autogenous grinding process, the ground dross then being separated into a granulated metal fraction and a fine-grained fraction. According to the apparatus of the invention, a hood is located over the inlet side of the cooling pipe so that the entrance of air into the pipe is substantially prevented. The skimming trough is sealingly engaged to the hood so that the dross is charged from the skimming trough into the cooling pipe without any substantial contact with the air. An autogenous grinding mill is provided having an inlet communicating with an outlet opening of the cooling pipe.

13 Claims, 2 Drawing Figures

INSTALLATION FOR TREATMENT OF WASTE METAL AND LIQUID DROSS

This is a division, of application Ser. No. 232309, filed Feb. 6, 1981 U.S. Pat. No. 4,394,978.

BACKGROUND OF THE INVENTION

The present invention relates to a method for the treatment of liquid dross and waste metal obtained in smelting and remelting plants and which is poured from the melting furnace into a skimming trough whereupon the dross is conveyed from the trough into a rotating, substantially horizontal cooling pipe in which it passes from one end to the other thereby becoming cooled below the melting point to obtain a granulated form. The invention further relates to apparatus for carrying out the method.

It is well known that waste metal and liquid dross obtained in the smelting and remelting of metal generally contain a substantial percentage of pure metal. For this reason, it is common practice for such waste metal and liquid dross to be collected and conveyed to separate recovery plants. According to the arrangement illustrated in German Offenlegungsschrift No. 27 13 281, which concerns the recovery of aluminum for aluminum dross, the hot aluminum dross is charged into a rotating open cooling drum in which it is cooled. The cooling and circulation of the dross in an open drum will of course result in oxidation of at least a portion of the aluminum due to contact with air. This results on the one hand in an increase in the temperature of the dross which must of course be compensated for through increased cooling action and on the other hand a decreased yield in the amount of pure aluminum recovered. Since aluminum oxide has a lower market value than pure aluminum, the economy of the procedure is not as high as is desired.

SUMMARY OF THE INVENTION

Accordingly, the main object of the present invention is to provide a new and improved apparatus for treating liquid dross so as to increase the amount of pure metal recovered therefrom.

It is understood that the apparatus of the present invention is applicable to the recovery of most metallic substances such, for example, as aluminum, zinc, lead, etc.

Briefly, in accordance with the present invention, this and other objects are obtained by providing a method wherein the hot liquid dross is cooled in the absence of air or oxygen and preferably while in an inert gas atmosphere. The apparatus is constructed such that the space occupied thereby is relatively small so that the recovery apparatus can be erected proximate to the location from which the dross is obtained.

According to the method of the invention, the cooled dross in granulated form is subjected to a subsequent grinding operation since the pure metallic material is found in greatest quantities in larger particles and the majority of the oxides and other impurities are present in the dust or fine-grained phase. Furthermore, yields are improved by the removal of dust in a screening station to which the dross is directed subsequent to the grinding operation since the oxide-rich fine dust can then be separated from the other fractions.

Thus, according to the present invention, the hot liquid dross is cooled in the absence of air or oxygen, such as under an inert gas atmosphere, after which the granulated dross is subjected to an autogenous grinding process. The ground dross is then separated, preferably by screening, into a granulated metal fraction and into a fine-grained fraction containing substantially powdered metal oxide.

According to the apparatus of the invention, a hood is located over the inlet side of the cooling pipe into which the liquid dross is charged so that the entrance of air into the cooling pipe through the inlet opening is prevented. The skimming trough from which the dross is charged into the cooling pipe is sealingly engaged to the hood so that the dross is charged into the cooling pipe without any substantially contact with air.

Other features of the apparatus of the present invention will be described in greater detail hereinbelow.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
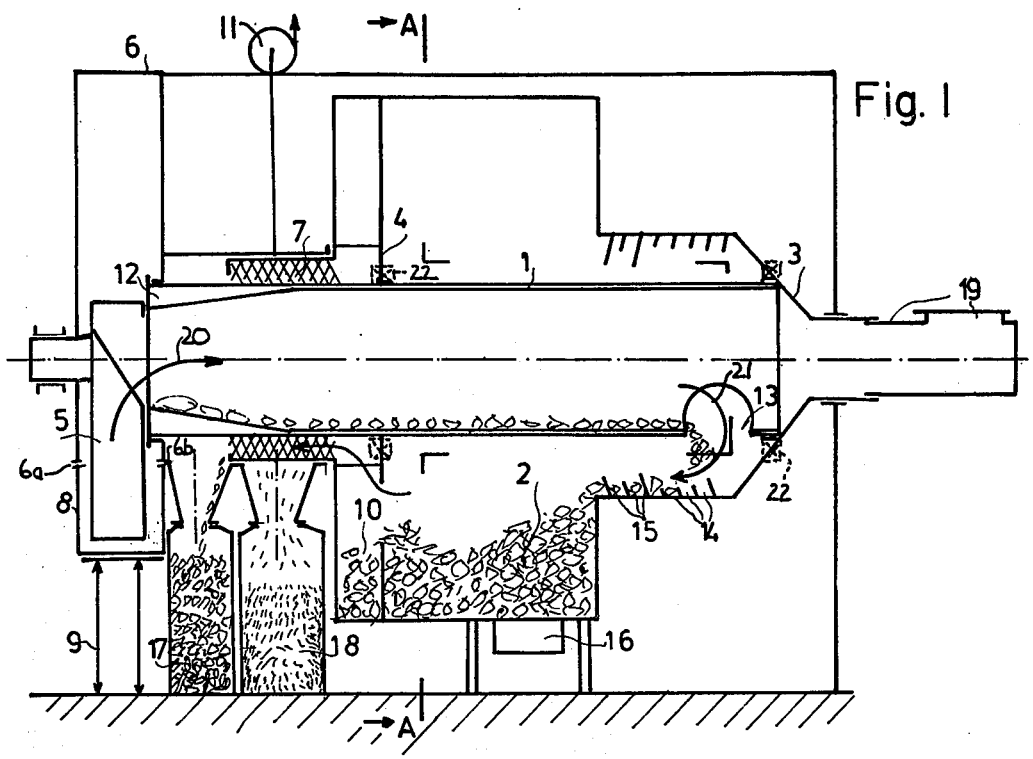
FIG. 1 is a side elevation view in schematic form illustrating one embodiment of treatment apparatus according to the present invention.

Referring now to the drawings wherein like reference characters designate identical or corresponding parts throughout the several views, the treatment apparatus illustrated in the figures are based on an embodiment of the invention for treating aluminum dross. However, as noted above, the present invention is equally applicable to the recovery of metals other than aluminum.

The treatment apparatus according to the present invention comprises a rotatably mounted sustantially horizontal cooling pipe 1 into the inlet side of which the liquid dross is charged from a skimming trough 8 by means of a bucket elevator 5. A hood 6 is located over the inlet side of the cooling pipe 1. The skimming trough 8 sealingly engages hood 6. Thus, hood 6 includes sealing means 6a, 6b and the skimming trough 8 is urged to sealing engagement with sealing means 6a such as by means of a table schematically shown at 9 on which the skimming trough 8 is placed by a fork lift or the like. The hood communicates with a source of inert gas.

In the above manner, entry of air into the cooling pipe is substantially prevented and the dross is charged from the skimming trough into the cooling pipe without substantial contact with air. This has the beneficial result that the aluminum (or other metal) no longer oxidizes as the dross moves through the cooling pipe so that increased yields of pure metal can be recovered and the temperature of the dross will not increase due to oxidation thereby decreasing the energy required for cooling.

The dross is charged from the skimming trough into the cooling pipe 1 by a bucket elevator 5 which substantially comprises two shovel-type arms which alternately lift the dross from the skimming trough 8 and conduct the dross in the direction of the axis of rotation through the inlet side of cooling pipe 1 as shown by arrow 20. In this manner the dross is charged from the skimming trough into the cooling pipe in an intermittent manner which facilitates the cooling thereof.

Cooling pipe 1 comprises a double-walled jacket through which a cooling liquid such, for example, as water, flows. In order to promote the forward movement of the dross in the cooling pipe 1, the inner wall of the pipe has an inwardly tapered or conical configuration 12 at the inlet end thereof. Thus, a downward sloping surface is presented to the dross at the initial end of the cooling pipe 1 so that the dross is prevented from backing up in the cooling pipe and possibly falling back into the skimming trough 8. The cooling pipe 1 is continually rotated in a manner described below so that the dross will wet only a portion of the circular cross-section of the inner surface thereof in a manner similar to an autogenous mill and is urged forwardly through the cooling pipe under its own weight. During this movement through the cooling pipe, the dross is cooled through contact with the inner wall and discharged in granulated form through a discharge opening 13 formed in pipe 1 into the inlet 14 of autogenous mill 2.

The autogenous mill 2 comprises a grinding drum having a substantially circular cross section and defined by end faces 3 and 4. The cooling pipe 1 is mounted substantially coaxially with respect to the mill 2 and in the illustrated embodiment is fixed thereto at end walls 3 and 4 for rotation therewith. In this connection, drive wheels 16 rotate both the cooling pipe 1 and grinding mill 2 as a fixed unit so that both rotate at the same speed.

The section of mill 2 comprising inlet 14 has a reduced diameter cross section in which substantially helical webs 15 are provided onto which the granulated dross falls from the discharge opening 13 in pipe 1. The helical web 15 acts on the dross not only to direct the same into the main section of the mill 2 but, additionally, to provide that dross will be maintained at the inlet section in amounts such that the same will provide a simple seal. Thus, the dross is directed as shown by arrow 21 from the discharge opening 13 of the cooling pipe into the inlet 14 of the mill wherein the helical webs 15 direct the same into the larger diameter portion thereof and at the same time accumulates the dross in a manner so as to seal the opening.

The autogenous mill is in constant rotation whereby the particulate solid dross is crushed upon itself i.e., autogenously so as to produce a dust fraction and a granular fraction, the latter constituting both a coarse grained fraction 17 and a fine grained fraction 18. Since larger particles are deposited on the larger circumference of the autogenous mill, the discharge from the mill can be conveyed into a screening station 7 by discharge apparatus, designated 10, similar to bucket elevator 5 and which is rigidly connected to the drive of mill. Screening station 7 separates the discharged material into the coarse grained fraction 17 and the fine grained fraction 18, the fractions being themselves discharged into appropriate containers. The coarse grained fraction 17 will contain substantially pure aluminum while the fine grained fraction 18 will contain the bulk of aluminum oxide and other powdered impurities.

According to another feature of the present invention, the screening station 7 is preferably ventilated during operation by means of a dust exhaust 11 whereby the dust content of the fine grained fraction 18 is reduced and the relative content of aluminum metal increased.

In a modification of the embodiment illustrated in the figures, the cooling pipe 1 can be provided with a separate drive so that its rotation will be independent with respect to that of the autogenous mill. In this connection, the cooling pipe 1 can be mounted in its own bearings, designated in phantom at 22 on end faces 3 and 4 of the autogenous mill. Such construction is advantageous in that both the cooling pipe 1 and the mill 2 can be rotated at respective optimum speeds so that these components can be designed independently of each other.

The treatment apparatus of the present invention may also be provided with a feeding device 19 on the side opposite to that of bucket elevator 5 through which cooled dross can be fed into the mill 2 directly through discharge opening 13 and inlet 14 whereupon the cooled dross is crushed to the desired grain size. The feeding device 19 is hermetically sealed during the cooling operation so no air can enter since it is important according to the present invention that the liquid dross be cooled rapidly in the absence of air.

In one illustrative embodiment of the present invention, if it assumed that the volume of the cooling pipe and associated apparatus is about 2 cubic meters, such volume will contain about 80 decagrams of oxygen with which about 1 kilogram of metallic aluminum can be oxidized. This will correspond to a loss through oxidation of less than 1% in a charge of 300 kilograms of dross having an aluminum content of about 50%. Of course, such loss is insignificant in practice.

It is important for the inner wall of the cooling pipe in the inlet region of the liquid dross to be smooth and have no fittings so that the dross cannot settle on such fittings. A self-smoothing effect has been observed in the operation of such cooling pipes, i.e., after a short time of operation, a thin aluminum film is formed on the inner pipe wall which prevents further caking of aluminum.

Figure 2:
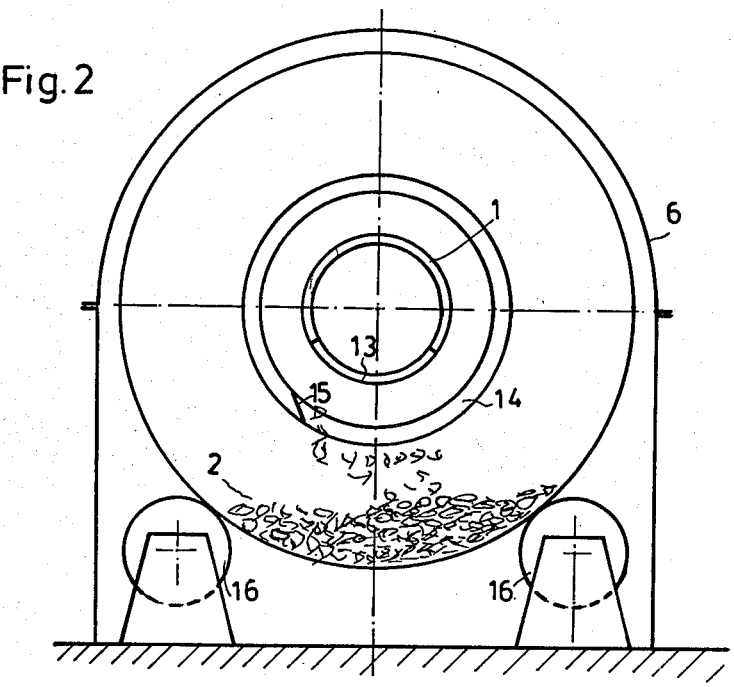
FIG. 2 is a section view taken aong line A—A of FIG. 1.

As seen in FIG. 2, the discharge opening 13 of cooling pipe 1 has a relatively large passage which will of course necessarily limit the maximum grain size of the dross. Thus, if pieces of solid dross are to be charged directly into the cooling pipe, such as through feeding device 19, and such pieces are larger than the size of discharge opening 13, such pieces of solid dross must be broken up in a known manner, e.g. manually, prior to being so charged in order to permit the solid dross pieces to pass through the opening 13 into the grinding mill 2. The helical web 15 of inlet 14 of mill 2 preferably comprises a single unitary member and as noted above promotes the advancement of the granular dross. In the illustrated embodiment, a pair of rollers 16 drive the mill along with screening station and cooling pipe. Both rollers 16 are driven by a common motor which is not shown.

Obviously, numerous modifications and variations of the present invention as possible in the light of the above teachings. It is therefore to be understood that within the scope of the claims appended hereto the invention may be practiced otherwise than as specifically disclosed herein.

What is claimed is:

1. Apparatus for treating liquid dross obtained from metal smelting and remelting apparatus, comprising:
   an autogenous grinding mill;

a cooling pipe rotatably mounted within said grinding mill and having an inlet opening at an inlet side thereof, said inlet opening of said cooling pipe situated outside said grinding mill, and a substantially smooth inner surface at least in the region of the inlet thereof;

means associated with said cooling pipe for cooling the same;

a skimming trough located adjacent to said cooling pipe inlet opening;

means for charging dross from said skimming trough into said cooling pipe through said inlet opening;

a hood located over said inlet side of said cooling pipe, said hood constituting means for substantially preventing entrance of air into said cooling pipe as dross is charged from said trough into said pipe so that the entrance of air into said cooling pipe through said inlet opening is substantially prevented; and wherein said skimming trough is sealingly engaged to said hood so that the dross is charged from said skimming trough into said cooling pipe without any substantial contact with air.

2. The combination of claim 1 wherein said autogenous grinding mill includes a pair of end faces and wherein said cooling pipe is mounted in said end faces substantially coaxially with respect to said mill.

3. The combination of claim 1 wherein said cooling pipe is rotatable relative to said autogenous mill and is adapted to be driven by a separate drive.

4. The combination of claim 1 wherein said cooling pipe includes a water-cooled double walled jacket.

5. The combination of claim 1 wherein said charging means comprises a bucket elevator.

6. The combination of claim 1 wherein said hood includes sealing means associated therewith and wherein said skimming trough is pressed against said sealing means to obtain said sealing engagement therewith.

7. The combination of claim 1 wherein an inner wall of said cooling pipe has a conical configuration in the region of the inlet end thereof.

8. The combination of claim 1 wherein said cooling pipe is rigidly connected with said autogenous mill and is adapted to be driven therewith by a common drive apparatus.

9. The combination of claim 1 wherein said mill has a substantially circular cross-section and further including a screening station provided in a continuation of said mill at a discharge end thereof, said screening station have a substantially circular cross-section having a diameter smaller than that of the mill.

10. The combination of claim 9 further including means for exhausting dust from the screening station.

11. Apparatus for treating liquid dross obtained from metal smelting and remelting apparatus, comprising:
an autogenous grinding mill;
a cooling pipe rotatably mounted within said grinding mill and having an inlet opening at an inlet side therof, said inlet opening of said cooling pipe situated outside said grinding mill, a water-cooled, double-walled jacket, and a substantially smooth inner surface at least in the region of the inlet thereof;
a skimming trough located adjacent to said cooling pipe inlet opening;
means for charging dross from said skimming trough into said cooling pipe through said inlet opening;
a hood located over said inlet side of said cooling pipe so that the entrance of air into said cooling pipe through said inlet opening is substantially prevented; and
wherein said skimming trough is sealingly engaged to said hood so that the dross is charged from said skimming trough into said cooling pipe without any substantial contact with air.

12. Apparatus for treating liquid dross obtained from metal smelting and remelting apparatus, comprising:
an autogenous grinding mill;
a cooling pipe rotatably mounted within said grinding mill and having an inlet opening at an inlet side thereof and an inner wall having a conical configuration in the region of the inlet thereof with a downwardly sloping surface in the direction of travel of dross through said pipe, said inlet opening of said cooling pipe situated outside said grinding mill;
a skimming trough located adjacent to said cooling pipe inlet opneing;
means for charging dross from said skimming trough into said cooling pipe through said inlet opening;
a hood located over said inlet side of said cooling pipe so that the entrance of air into said cooling pipe through said inlet opening is substantially prevented; and
wherein said skimming trough is sealingly engaged to said hood so that the dross is charged from said skimming trough into said cooling pipe without any substantial contact with air.

13. Apparatus for treating liquid dross obtained from metal smelting and remelting apparatus, comprising:
an autogenous grinding mill;
a cooling pipe rotatably mounted within said grinding mill and having an inlet opening at an inlet side thereof, and a substantially smooth and continuous inner surface extending from the region of said inlet opening for at least one half the length of the cooling pipe;
means associated with said cooling pipe for cooling the same;
a skimming trough located adjacent to said cooling pipe inlet opening;
means for charging dross from said skimming trough into said cooling pipe through said inlet opening;
a hood located over said inlet side of said cooling pipe, said hood constituting means for substantially preventing entrance of air into cooling pipe as dross is charged from said trough into said pipe so that the entrance of air into said cooling pipe through said inlet opening is substantially prevented; and
wherein said skimming trough is sealingly engaged to said hood so that the dross is charged from said skimming trough into said cooling pipe without any substantial contact with air.

* * * * *